United States Patent [19]

Moeller

[11] 4,081,410
[45] Mar. 28, 1978

[54] POLYSILOXANE SURFACTANTS USEFUL FOR FOAMING POLYURETHANE FOAMS

[75] Inventor: Richard E. Moeller, Troy, N.Y.

[73] Assignee: General Electric Company, Waterford, N.Y.

[21] Appl. No.: 672,087

[22] Filed: Mar. 31, 1976

Related U.S. Application Data

[60] Continuation-in-part of Ser. No. 540,671, Jan. 13, 1975, abandoned, which is a division of Ser. No. 99,717, Dec. 18, 1970, abandoned.

[51] Int. Cl.² .......................... C08G 18/14; C07F 7/02
[52] U.S. Cl. ...................... 260/2.5 AH; 260/448.2 B
[58] Field of Search .................................. 260/2.5 AH

[56] References Cited

U.S. PATENT DOCUMENTS 3,654,195  4/1972  Raleigh .......................... 260/2.5 AH
3,723,491  3/1973  Rossmy et al. ................. 260/2.5 AH Primary Examiner—H.S. Cockeram Attorney, Agent, or Firm—E. Philip Koltos; John L. Young; Frank L. Neuhauser

[57] ABSTRACT

A polysiloxane surfactant useful in controlling the foaming of a polyurethane foam having the formula,

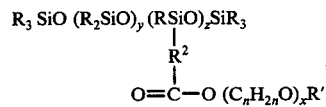

where $y$ is a whole number varying from 15 to 150 and $z$ is a whole number varying from 3 to 16 where R and R' are monovalent hydrocarbon radicals of less than 8 carbon atoms, $R^2$ is selected from alkylene and arylene radicals of from 11 to 20 carbon atoms, $n$ is an integer that varies from 2 to 4, $x$ varies from 5 to 30 for the case $n$ is equal to 2, $x$ varies from 1 to 40 for the case $n$ is equal to 3 and 4 where there may be ether units with $n$ equal to 2,3, and 4 in the same molecule.

3 Claims, No Drawings

POLYSILOXANE SURFACTANTS USEFUL FOR FOAMING POLYURETHANE FOAMS

BACKGROUND OF THE INVENTION

This application is a continuation-in-part of application Ser. No. 540,671, filed Jan. 13, 1975 now abandoned, which is a division of application Ser. No. 99,717, filed Dec. 18, 1970 and now abandoned.

The present invention relates to polysiloxane-oxyalkylene block copolymers and, in particular, the present invention relates to polysiloxane-oxyalkylene block copolymers which are useful in controlling the cell size and density of a polyurethane foam during the foaming procedure.

Polyurethane foams are formed by reacting a polyisocyanate with a polyol which may be a polyether containing hydroxyl groups or a polyester containing hydroxyl groups in the presence of a blowing agent, a catalyst such as tin catalyst, and a surfactant. When the polyisocyanate reacts with the polyol, heat is generated which evaporates the blowing agent so it passes through the liquid mixture forming bubbles therein. In addition, water may be added to the mixture to react with excess polyisocyanate to generate carbon dioxide which passes through the mixture forming bubbles. If a surfactant is not used in the foaming composition, then the bubbles simply pass through the liquid mixture without forming a foam.

In the past, many surfactants were used to form a foam from the liquid mixture, as well as to control the size of the bubbles in the foam so that a foam of a desired density was obtained. Preferably, a foam with small bubbles or cells therein of uniform size was desired in that it was the most desirable foam, that is, a foam having a lower density. As the result of research, it was discovered that polysiloxanes having oxyalkylene units in the polymer chain were useful as surfactants in foaming polyurethane foam. In fact, it was discovered that these polysiloxane-oxyalkylene block copolymers were much more efficient surfactants in foaming polyurethane foam, that is, a smaller quantity of these surfactants was used to produce foams of lower density than was possible with other surfactants.

One difficulty with these polysiloxane surfactants was that the oxyalkylene group was attached by a silicon to oxygen to carbon linkage. This linkage proved to be hydrolytically unstable in that as soon as as any water came into contact with the surfactant, the silicon to oxygen to carbon linkage would be hydrolyzed in a polysiloxane polymer which had an unacceptable foaming efficiency for forming polyurethane foams.

It is to be noted that in forming polyurethane foams rigid foams are formed with closed cells, while in flexible foam most of the cells are desirably open celled. This is desirable in flexible foams in that a large number of closed cells in the foam will impair the breatheability of the foam structure and its ability to return to its original shape after it has been crushed. Thus, it has been found that polysiloxane polymers which do not have oxypropylene moieties attached thereto are unsuitable as foaming agents for flexible foam in one aspect in that most of the cells that are formed are closed cells.

Another disadvantage with the present polysiloxane-oxyalkylene block copolymers that are used as surfactants for polyurethane foams is that they may only be used for flexible or rigid foams and that a common formulation that can be used for both flexible and rigid foams with minor variation of molecular structure has not been as yet discovered.

In order to improve the hydrolytic stability of the available polysiloxane-oxyalkylene block copolymers, there have been proposed polysiloxane-oxyalkylene block compolymers in which there are SiC linkages connecting the silicon to the polyether moiety. The polyether moiety has an unsaturated olefin group attached to it, which group is reacted with a polysiloxane having free hydrogen atoms through an Si-H olefin addition reaction to form the desired compound. However, the disadvantage of this process for producing polysiloxane-oxyalkylene block copolymers with an Si-C linkage is that it is necessary to produce polyethers with an unsaturated moiety attached thereto. This involves reacting an unsaturated acid, such as an alkenoic acid or unsaturated alcohol, with alkylene oxides to produce the unsaturated polyether. Such compounds are only commercially available to companies and firms that produce and manufacture polyether, for their own particular use.

Another disadvantage of this process for forming polyethers with an unsaturated moiety therein is that it is very difficult to control the number and type of oxyalkylene groups in the polyether chain. There is a much more simple and efficient way to control the type and amount of oxyalkylene groups in the polyether moiety by blending in different types of polyethers. However, this is not possible by the process of the prior art.

Accordingly, it is one object of the present invention to provide a polysiloxane-oxyalkylene block copolymer in which the oxyalkylene moiety is connected to the silicon atom through a silicon-carbon linkage.

It is another object of the present invention to provide a process for producing a polysiloxane-oxyalkylene block copolymer with a silicon-carbon linkage connecting the polysiloxane moiety to the oxyalkylene moiety, which process is more economical and efficient than prior processes.

It is still another object of the present invention to provide a polysiloxane-oxyalkylene block copolymer surfactant for polyurethane foams having silicon-carbon linkages connecting the oxyalkylene moiety to the polysiloxane moiety, which surfactant is much more efficient in producing both flexible and rigid foams that are the prior art surfactants.

It is yet another aim of the present invention to provide an alkenoic acid polyether condensation product which can be used to add polyether groups to a polysiloxane by the use of an SiH-olefin addition reaction.

These and other objects of the present invention are accomplished by means of the invention set forth below.

Summary of the Invention

In accordance with the present invention, there is provided a polyurethane foam composition formed from a mixture of polyether or polyester, a polyisocyanate, a catalyst for catalyzing the reaction between the polyether and polyisocyanate, and a polysiloxane surfactant for controlling the foam comprising a compound of the formula:

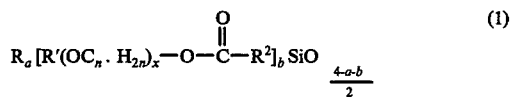

where R and R' are monovalent hydrocarbon radicals of less than 8 carbon atoms, $R^2$ is selected from alkylene and arylene radicals of from 11 to 20 carbon atoms, $n$ is an integer that varies from 2 to 4, $x$ varies from 5 to 30, for the case $n$ is equal to 2, $x$ varies from 1 to 40 for the case $n$ is equal to 3 to 4 where there may be either units with $n$ equal to 2, 3 and 4 in the same molecule, $a$ is a number varying from 1.51 to 1.99 and $b$ varies from 0.019 to 0.45 where the sum of $a + b$ varies from 2.012 to 2.1.

There is also provided by the present invention a process for producing the above surfactant which comprises reacting an alkenoic acid having the formula, $$CH_2=CHR^3COOH, \qquad (2)$$

with a polyether in the presence of an acid catalyst with the polyether selected from the group having the formulas $R'(OC_2H_4)_xOH$, $R'(OC_2H_4)_c(OC_3H_6)_dOH$, $R'(OC_2H_4)_c(OC_4H_8)_eOH$, and $R'(OC_2H_4)_c(OC_3H_4)_d$-$(OC_4H_8)_eOH$ to form an unsaturated intermediate which is in turn reacted in the presence of a platinum catalyst with a hydropolysiloxane having the formula, $$R_aH_bSiO_{(4-a-b/2)} \qquad (3)$$

where R is a monovalent hydrocarbon radical of less than 8 carbon atoms, $R^3$ is a divalent hydrocarbon radical of from 9 to 18 carbon atoms selected from alkylene radicals and arylene radicals, c is a whole number varying from 5 to 30, d, e are whole number varying from 0 to 40, a is a number varying from 1.51 to 1.99, b varies from 0.019 to 0.45 and the sum of a + b varies from 2.012 to 2.1.

Preferably, the catalyst used in the condensation reaction is toluene sulfonic acid and the condensation reaction is carried out at 70° to 200° C. Further, preferably, the alkenoic acid is vinyl acetic acid, and R in formulas (1) and (3) is preferably methyl. In the compound of formula (1), n is preferably equal to 2 throughout the polyether moiety with c varying from 5 to 30 in the case where the surfactant is to be used for forming rigid foams. In the case of flexible foams, the polyether moiety contains both ethylene oxide units and propylene oxide units and may contain butylene oxide units where the amount of ethylene oxide units varies from 5 to 30, the amount of propylene oxide units and butylene oxide units varies from 1 to 40.

DETAILED DESCRIPTION OF THE PREFERRED EMBODIMENT

The radicals represented by the various symbols appearing in formulas (1), (2) and (3) are well known in the art and are typified by the radicals usually associated with silicon-bonded organic groups in the case of R and are generally associated with monoalkyl ethers or polyalkyl ether glycols in the case of R' and the use of a divalent hydrocarbon radical in the case of $R^2$. The organic radicals represented by R include monovalent hydrocarbon radicals, halogenated monovalent hydrocarbon radicals and cyanoalkyl radicals. Thus, the radicals R and R' may be alkyl, such as methyl, ethyl, propyl, butyl, octyl radicals; aryl radicals, such as phenyl, tolyl, xylyl, naphthyl, radicals; aralkyl radicals, such as benzyl, phenylethyl radicals; olefinically unsaturated monovalent hydrocarbon radicals such as vinyl, allyl, cyclohexyl radicals; cycloalkyl radicals such as cyclohexyl, cycloheptyl radicals; halogenated monovalent hydrocarbon radicals such as chloromethyl, dichlorophropyl, 1,1,1-trifluoropropyl, chlorophenyl, dibromophenyl and other such radicals; cyanoalkyl radicals such as cyanoethyl, cyancpropyl, etc. Preferably, the radicals represented by R have less than 8 carbon atoms and, in particular, it is preferred that R be methyl, ethyl or phenyl. In addition, it is preferred that the radicals represented by R' be lower monovalent hydrocarbon radicals, halogenated monovalent hydrocarbon radicals and cyanoalkyl radicals of less than 8 carbon atoms. Thus, R' may be selected from alkyl radicals containing from 1 to 7 carbon atoms, both straight chain and branched chain; aryl radicals such as phenyl, tolyl, xylyl, naphthyl, etc. Preferably, R' is a lower alkyl radical with 1 to 4 carbon atoms, such as methyl, ethyl, propyl and butyl. The divalent radical represented by $R^2$ may be any divalent hydrocarbon radical of from 11 to 20 carbon atoms or may be a halogenated divalent hydrocarbon radical of less than 20 carbon atoms. The radicals represented by $R^2$ may be any alkylene or arylene radicals of from 11 to 20 carbon atoms.

As pointed out above previously, the method of preparing the polysiloxane-oxyalkylene block copolymers is to react the alkenoic acid of formula (2) with any monoalkyl or monoaryl ether of polyalkylene glycol having the general formula, $$R'(OC_nH_{2n})_xOH, \qquad (4)$$

where $n$ and $x$ and R' are defined above so as to obtain a monoalkyl glycol having the formula, $$CH_2=CH(R^3)_xC\overset{O}{\overset{\|}{-}}O-(C_2H_4O)_c(C_3H_6O)_d(C_4H_8O)_eR' \qquad (5)$$

where R' is defined above, $R^3$ is a divalent hydrocarbon radical selected from arylene and alkylene radicals of from 9 to 18 carbon atoms, c is a whole number varying from 5 to 30 and d and e are whole numbers varying from 0 to 40. This polyalkylene glycol can then be reacted with the compound of formula (3) to form the block copolymer of the present invention.

This alkenoic acid, as well as the longer carbon chained alkenoic acids of 11 or more carbon atoms, are prepared by reacting allyl chloride or the longer chain unsaturated olefin chlorides with cuprous cyanide to form the allyl cyanide and the longer chain olefin cyanides, as the case may be.

The polyalkylene glycols within the scope of formula (4) are also well known in the art. These materials are formed by reacting a monomeric alcohol of the formula R'OH with an alkylene oxide or mixtures of alkylene oxides. By controlling the reaction conditions during the reaction between the aforementioned monohydric alcohol and the polyalkylene oxide the molecular weight of the polyalkylene glycol monoether can be controlled. There are only certain polyalkylene glycol monethers which can be employed to produce the surfactants of the present case. In any case, there must be at least 5 oxyalkylene units in the monoether that is used in the present case. In other words, x of formula (4) must be equal to at least 5. As indicated by formulas (1) and (4), the polyalkylene glycol monoethers contain oxyalkylene groups of from 2 to 4 carbon atoms which include within these oxyalkylene groups, for example, oxyethylene, oxypropylene-1,2, oxypropylene-1,3 oxybutylene-1,2, etc. The monoethers of formula (4) may contain only one type of oxyalkylene groups or a mixture of oxyalkylene groups. To produce rigid foams, the polyalkylene glycol monoether should contain just ethylene oxide groups. In that case, $x$ varies from 5 to 30. It has been found that when the polyalkylene glycol monoether contains 5 to 30 oxyethylene groups, that a good surfactant is produced for rigid foams. For flexible foams or for semi-rigid foams, there should be a mixture of oxyethylene and oxypropylene groups in the polyalkylene glycol monoether. For such flexible foams there may be also utilized mixtures of oxyethylene and oxybutylene or there may be utilized mixtures of oxyethylene, oxypropylene and oxybutylene units in the polyalkylene glycol monoether polymer chain. To produce a good surfactant for flexible foams or for semi-rigid foams, the number of oxyethylene units may vary from 5 to 30 while the number of oxypropylene and oxybutylene units may vary from 1 to 40. More preferably, to produce good surfactants for flexible foam, there should be 5 to 30 oxyethylene and 10 to 40 oxypropylene units in the polyalkylene glycol monoether polymer chain. For the rigid foams, the surfactant may have a small amount of oxypropylene and oxybutylene units in the polymer chain but, in any case, no more than 3 of such units should be in the polyalkylene glycol monoether chain. Both in the case of the flexible foams and rigid foams, the silicon units in the polysiloxane surfactant should comprise 15 to 40% by weight of the total molecular weight of the block copolymer. With respect to flexible foams, it has been found that it is most advantageous to have the silicon units constitute 30 to 33% by weight of the molecular weight of the oxyalkylene polysiloxane block copolymer. With low molecular weight oxyalkylene polysiloxane copolymers, there can be a little as 15% by weight of siloxy units in the polymer chain to obtain an acceptable surfactant. By a low molecular weight polymer, it is preferred that the oxyalkylene polysiloxane polymer having a molecular weight of 300 to 3,000. Where the molecular weight of the oxyalkylene polysiloxane block copolymer is from 3,000 and above, the siloxy units in the polymer chain should constitute more than 15% by weight of the molecular weight of the polymer. Preferably, however, the siloxy units should constitute 30 to 33% by weight of the molecular weight of the polymer. For further information as to the production of the polyalkylene glycol monoethers useful in the practice of the present invention, the reader is referred to U.S. Pat. Nos. 2,425,755 and 2,448,644.

The organohydrogenpolysiloxanes within the scope of formula (3) are also well known in the art and as indicated by formula (1), the organohydrogenpolysiloxane contains an average of 0.019 to 0.45 silicon-bonded hydrogen atoms per silicon atom. If there is more than 2.00 total hydrogen atoms and R groups per silicon atom in the organohydrogenpolysiloxane of formula (3), it is apparent that the polysiloxane is actually a copolymer of two or more different types of siloxane units. Thus, the organohydrogenpolysiloxane of formula (3) can be described as a copolymer of one or more types of siloxane units having the formula, $$(H)_f(R)_g SiO_{(4-f-g/2)} \tag{6}$$

where R is as previously defined and $f$ is a whole number equal to from 1 to 2, inclusive, preferably 1, $g$ is a whole number equal to from 0 to 2, inclusive, and the sum of $f$ and $g$ is equal to 1 to 3, inclusive, together with one or more types of siloxane units having the formula, $$(R)_h SiO_{(4-h/2)} \tag{7}$$

where R is as previously defined and $h$ is a whole number equal to from 0 to 3, inclusive. The proportions and types of siloxanes used in formula (6) and the siloxane units of formula (7) are selected so as to produce the copolymer containing from 0.019 to 0.45 hydrogen atoms per silicon atom and from 1.51 to 1.99 R groups per silicon atom with the sum of the numbers of hydrogen atoms and R groups to be equal to from 2.012 to 2.1 per silicon atom.

The organopolysiloxanes within the scope of formula (3) can be prepared by the cohydrolysis of one or more hydrogen-containing chlorosilanes such as trichlorosilane, dichlorosilane and methylhydrogendichlorosilane, phenylhydrogendichlorosilane, dimethylhydrogenchlorosilane, methylphenylhydrogenchlorosilane, etc., with one or more other organochlorosilanes, such as methyltrichlorosilane, dimethylchlorosilane, trimethylchlorosilane, methylphenyldichlorosilane, to produce the desired siloxanes.

Another method which is more preferred is to form cyclics from the chlorinated siloxanes and then to react the cyclics to produce the desired hydropolysiloxanes. Thus, methylhydrogentetracyclosiloxane may be reacted or equilibrated with dimethyltetracyclosiloxane to produce the desired polysiloxanes. Hexamethyldisiloxane is also added to the reaction mixture to produce the chain-stopped units for the polymer chains. By this method they can produce the preferred type of organohydrogensiloxanes within the scope of formula (3) used in preparing the polysiloxane-oxyalkylene copolymers of the present invention. The preferred polymer produced in accordance with the above method which is within the scope of formula (3) are the triorganosilyl chain-stopped copolymers of diorganosiloxane units and organohydrogensiloxy units having the formula, $$R_3SiO(R_2SiO)_y(RSiO)_z SiR_3 \tag{8}$$
$$\phantom{R_3SiO(R_2SiO)_y(}{\overset{|}{\underset{|}{H}}}$$

where R is as previously defined and preferably methyl, $y$ is a whole number which may vary from 15 to 150 and $z$ is a whole number varying from 3 to 16, where the sum of $y$ plus $z$ may vary from 18 to 166. In the formula, $z$ must have a value of at least 3 in order to produce the preferred polysiloxane-oxyalkylene block copolymers of the present case, in that there must be at least 3 hydrogen groups in the polymer chain to which can be added at least 3 polyalkylene glycol monoether units. With less than 3 polyalkylene glycol monoether units in the polymer chain, a good surfactant is not formed either for flexible foams or rigid foams.

The reaction for producing the polyalkylene glycol monoether of formula (4) is fairly straight-forward. Depending upon the use for which the surfactant is intended, whether for rigid foams or for flexible foams, a blend of the desired polyalkylene glycol monoethers is first prepared. A blend of polyalkylene glycol monoethers is not necessary when the surfactant is to be used for rigid foams, since only ethylene oxide units are desired in the polyalkylene glycol monoether. However, in preparing a surfactant for flexible foams, it is preferable to blend a number of commercially available polyalkylene glycol monoethers so that the final product will have the desired ethylene oxide and propylene oxide and/or butylene oxide units in the monoether polymer chain.

The polyalkylene glycol monoether blend is then reacted with the alkenoic acid in approximately molar amounts. An excess of the alkenoic acid may be used to insure all the polyalkylene glycol monoethers will react in a condensation reaction with an alkenoic acid. The two reactants are preferably present in a solvent which may be selected from any inert organic solvent such as benzene, toluene, xylene, cyclohexane, and mineral spirits. The solution of the reactants is then heated to the reflux temperature of the solvent which may vary anywhere from 70° to 200° C and the water of esterification can then be preferably removed by any appropriate azeotropic procedure. The reaction is allowed to proceed to completion in about 5 to 15 hours. In order for the reaction to be completed in 5 to 10 hours, there is preferably used a catalyst in the reaction mixture. Such a catalyst may be, for example toluene sulfonic acid, which is not a particularly strong acid. A stronger acid, such as sulfuric or hydrochloric acid, is not desirable as a catalyst since it will cleave the oxyalkylene linkages.

Another suitable catalyst is sodium hydrogen sulfate and other similar types of acids. After the 5 to 10 hour period the solution is cooled to below 70° C and sodium carbonate and water are added to neutralize the acid catalyst, and the excess alkenoic acid. The water is then azeotroped out at a temperature of 70° to 100° C and the mixture cooled to 30° C so that the salt that is precipitated out can be filtered from the solution. The toluene, xylene or other type of solvent used in the reaction mixture can then be stripped off under vacuum at a pot temperature of 50° to 100° C to leave behind the alkenyl glycol monoether. A small amount of solvent can be left behind with the alkenyl monoether since it does not have any effect whatsoever on the SiH-olefin addition reaction to which the alkenyl polyether is subjected. In fact, the inert solvent is removed solely for the purpose of determining whether the alkenyl polyether is obtained from the reaction. In any event, the reaction product from the condensation reaction is a polyether with terminal vinyl groups. To this alkenyl polyether there is added the organohydrogenpolysiloxane of formula (3) in the presence of a catalyst which promotes the addition of the SiH group on the organohydrogenpolysiloxane across the double bonds of the vinyl-terminated polyether. When there is only one hydrogen group in the hydrogenpolysiloxane of formula (3), there is added equivalent molar amounts of the alkenyl polyether to the hydrogenpolysiloxane. Preferably, there is added 5 to 10 mole percent excess of the alkenyl polyether based on the number of silicon-bonded hydrogen groups in the hydrogenpolysiloxane. The purpose of the excess of the unsaturated groups is to insure that the reaction removed all of the silicon-bonded hydrogen groups so that none is present in the final product. Preferably, also, the reaction is carried out in an inert solvent which may be selected friom benzene, toluene, xylene, cyclohexane and mineral spirits. If the reaction is not carried out in solvent, then the reaction mixture gels as the reaction proceeds. The reaction mixture is heated to 50° to 100° C and the reactants are allowed to react for a period varying from 1 to 10 hours and, preferably from 2 to 5 hours.

Suitable catalysts for addition of the organohydrogenpolysiloxane to the alkenyl polyether are the various platinum and platinum compound catalysts known in the art. These catalysts include elemental platinum in a finely divided state which can be deposited on charcoal or alumina, as well as various platinum compounds such as chloroplatinic acid, the platinum hydrocarbon complex of the type shown in U.S. Pat. Nos. 3,159,601 and 3,159,662, as well as the platinum alcoholic complexes prepared from chloroplatinic acids which are described and claimed in Lamoreaux U.S. Pat. No. 3,220,972. Preferably, the platinum catalyst is added to the organohydrogenpolysiloxane located in the reaction chamber to which is also added a solvent and then the alkenyl polyether is slowly added to the reaction mixture at the reaction temperatures described above.

A preferred hydrogenpolysiloxane coming within the scope of formula (3) is one having a hydrogen group at a terminal position of the polymer chain as well as a hydrogen group in the center position of the polymer chain. Such a hydrogenpolysiloxane has generally the formula

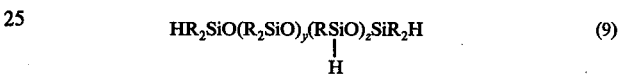
$$HR_2SiO(R_2SiO)_y(RSiO)_zSiR_2H \quad (9)$$
$$|$$
$$H$$

where $y$ is a whole number varying from 15 to 150, $z$ is a whole number varying from 3 to 16, and the sum of $y$ plus $z$ varies from 18 to 166. This compound may easily be prepared by reacting the proper moles of dihydrotetramethyldisiloxane as the terminal chain-stopper, with tetramethylhydrogencyclosiloxane and tetradimethylcyclosiloxane. The equilibration reaction products obtained when the above reactants are equilibrated in the presence of potassium hydroxide at a temperature about 100° C is the compound whose structure is set forth above in formula (9). When the compound within the scope of formula (9) is used in the SiH-olefin addition reaction, one mole of the compound is reacted with 3 moles or more of the alkenyl polyether of formula (5). The resulting compound obtained by the SiH-olefin addition reaction has polyether groups in the terminal position of the polysiloxane chain, as well as polyether units in the center of the polysiloxane chain. Whether elemental platinum or one of the platinum compound catalysts or a platinum complex catalyst is used, the catalyst is generally used in an amount sufficient to provide about $10^{-4}$ to $10^{-6}$ moles of platinum per mole of the alkenyl polyether of formula (5). As mentioned previously, the reaction is effected by adding the hydrogenpolysiloxane to the group of solvents discussed previously and then the mixture is heated to 70° to 130° C. At this temperature there is added the platinum catalyst such that the catalyst is dispersed throughout the hydrogenpolysiloxane. The alkenyl polyether may then be added dropwise over a 2 to 3 hour period or added in a bulk amount and the reaction allowed to proceed to completion for a period of time varying from 4 to 10 hours. Throughout the reaction period, the reaction temperature is maintained at the temperature range of 70° to 130° C and preferably at a temperature range of 70° to 100° C. After the reaction period is over, a sample of the reaction mixture may be checked by infrared analysis of SiH bonds to determine how far the reaction has proceeded to completion. When at least 95% of the SiH polysiloxane has been converted to the copolymers, then the reaction mixture may be cooled and the reaction may be considered to have proceeded to a sufficient extent for the conversion of the oxyalkylene polysiloxane copolymer. A buffer is then added to the reaction mixture. The resulting copolymer with the buffer therein may then be cooled to room temperature and filtered to remove the platinum catalyst therefrom.

The buffer which is added to the copolymer improves the shelf life of the copolymer since it raises its pH in the range of 7 to 9. This level of pH eliminates acid radicals from the copolymer product. Strong acids may attack and break the carboxyl group linkage connecting the polyether groups with the siloxy groups. By raising the pH of the copolymer product to a level of 7 to 9, there is assured that there is no free acid mixed in with the product, and thus the product which is thus neutralized can be stored for extended periods of time without any degradation of the polymer taking place. The copolymer surfactant as produced can then be mixed with polyurethane foam mixtures prior to their foaming so as to allow the polyisocyanate and polyol which form the polyurethane initial foaming mixture to foam in a desirable manner so as to produce a low density foam with cells therein of small, uniform cell size.

The polyisocyanates which are useful in the practice of the present invention are those well known polyisocyanates which are conventionally used in the manufacture of polyurethane foams. Generally speaking, the polyisocyanates contain at least two isocyanate groups per molecule with the isocyanate groups being separated from each other by at least three carbon atoms, i.e., the isocyanate groups are not on adjacent carbon atoms in the polyisocyanate. These polyisocyanates can be aromatic or aliphatic, and can be characterized by the formula, $$Y(N=C=O)_f$$

where Y represents a polyvalent organic radical having a valence $f$, where $f$ has a value of at least 2, and preferably from 2 to 3, inclusive. The number of isocyanate groups is, of course, equal to the number of free valences in the radical Y. In general, the radical Y consists preferably of carbon and hydrogen atoms on ly, but can also include oxygen atoms, Preferably also, the radical Y is a mononuclear aromatic radical. Illustrative of the various polyisocyanates which can be employed in the practice of the present invention can be mentioned, for example 2,4,-toluene diisocyanate; m-phenylene diisocyanate; methylene-bis-(4-phenylisocyanate); 4-methoxy-m-phenylene diisocyanate; 1,6-hexamethylene diisocyanate; 2,4,6-toluene triisocyanate; 2,4,4'-diphenylether triisocyanate; 2,6-toluene diisocyanate; 3,3'-bitolyene-4,4'-diisocyanate; diphenylmethane-4,4'-diisocyanate; 3,3'-dimethyldiphenylmethane-4,4'-diisocyanate; triphenylmethane triisocyanate; diansidine diisocyanate; etc. In addition to using only a single isocyanate in the production of polyurethane foams, it is also contemplated that mixtures of various isocyanates can be employed.

The polyols employed in the practice of the present invention are those polyols conventionally used in the manufacture of polyurethan foam products. Chemically, these materials fall into one of two general categories. The first is the hydroxyl-containing polyester and the second is the hydroxyl-containing polyether. The polyesters are conventionally formed by the reaction of a polyhydric alcohol with a dibasic acid. The polyhydric alcohol is employed in excess so that the resulting material contains free hydroxyl groups. Illustrative to the types of polyester-polyol materials employed in the production of polyurethane foams are polyesters formed by the reaction between dibasic acids, such as adipic acid, with polyhydric alcohols, such as ethylene glycol, glycerine, pentaerithritol, sorbitol, and the like. In general, these polyester polyols are prepared so as to contain from about 2 to about 8 hydroxyl groups per molecule.

The polyether polyols employed in the practice of the present invention for the manufacture of polyurethane foams can be subdivided into two groups, the first of which is a polyalkylene glycol, such as polyethylene glycol or polypropylene glycol, or mixed polyethylene-polypropylene glycol. The second type is polyoxyalkylene derivative of a polyhydric alcohol, such as a polyoxyalkylene derivative of glycerine, trimethylol ethane, trimethylol propane, neopentaglycol, sorbitol, sucrose, etc. These materials are well known in the art and are prepared by effecting reaction between an alkylene oxide or a mixture of alkylene oxides and the polyhydric alcohol. One common type of material is prepared by reacting 1,2-propylene oxide with glycerine to form a triol containing three polyoxypropylene segments attached to the glycerine nucleus.

These polyester polyols and polyether polyols are characterized by molecular weights of the order of 350 to 10,000. The type of polyurethanefoam desired — flexible, semi-rigid, or rigid — will determine the functionality and molecular weight of the polyol used. In general, either the polyester polyol or the polyether polyol can be used interchangeable in the manufacture of either rigid polyurethane foams, semi-rigid polyurethane foams or flexible polyurethane foams. In general, the polyols used in the formation of rigid foams have molecular weights in the range of from about 350 to 1,000. Generally, these polyols are triols or higher polyols. For the manufacture of semi-rigid foams, the polyol has a molecular weight in the range of about 1,000 to 2,500 and is generally a triol or a mixture of a triol with polyols of higher functionality. For the manufacture of flexible foams, the polyol has a molecular weight of the range of from about 2,500, up to 10,000 and is a triol or a mixture of triol and a diol.

Along with the polyisocyanate and the polyol, a blowing agent is found in the polyurethane foam reaction mixture. The foams are usually blown with carbon dioxide, halocarbon or a mixture of each. Water included in the foam formulation reacts with the isocyanate groups and results in the liberation of carbon dioxide which serves as a blowing agent. However, it is often not desirable to form the low density foams using the carbon dioxide generated in situ as the only blowing agent, since the generation of carbon dioxide also results in cross-linking of the foam through di-substituted urea linkages. A high level of such linkages results in stiffer foams than would be obtained otherwise.

Accordingly, in those cases where soft foams are desired, the reaction mixture often includes a separate blowing agent, such as a low boiling, inert liquid. The ideal liquid is one which has a boiling point slightly above room temperature, i.e., a temperature of about 20° to 25° C so that the heat generated by the exothermic reaction between the hydroxyl groups and the isocyanate will warm the reaction mixture to a temperature above the boiling point of the liquid blowing agent and vaporize it. Suitable blowing agents include alkanes having appropriate boiling points but the most desirable blowing agents have been found to be trichlorofluoromethane or methylene chloride.

In rigid foams intended for thermal insulation, halocarbons are often used exclusively as blowing agents because of the low thermal caonductivity of halocarbons as opposed to carbon dioxide or air. Trichlorofluoromethane is the preferred blowing agent for conventional systems, while a mixture of trichlorofluoromethane and dichlorodifluoromethane is used in the well known frothing processes.

Other ingredients often found in the polyurethane foam reaction mixture are various catalyst. For example, it is often desirable to add a catalyst to facilitate the reaction between water present in the reaction mixture and isocyanate groups. A typical type of catalyst for this reaction is a tertiary amine catalyst. These amine catalysts and their use are well known in the art and include materials such as N-methylmorpholine, dimethylethanol amine, triethyl amine, N,N'-diethylcyclohexyl amine, dimethylhexadecyl amine, dimethyloctadecyl amine, dimethylcocoamine, dimethylsilyl amine, N-cocomorpholine, triethylene diamine, etc.

To catalyze the reaction between the hydroxyl groups of the polyol and the polyisocyanate, polyurethane foam reaction mixtures often contain a catalyst comprising a metal salt of an organic carboxylic acid. Most often, this curing agent is a tin salt, such as tin stearate, dibutyl tin dilaurate, tin oleate, tin octoate, etc.

The proportions of the various components of the polyurethane foam reaction mixture may vary within wide limits as is well known in the art. When water is added to the reaction mixture, it is present in an amount sufficient to generate the amount of carbon dioxide desired. Generally, when water is employed, it is present in an amount up to about 5 parts per 100 parts by weight of the polyol. The polyisocyanate is generally present in an excess over the amount theoretically required to react with both the hydroxyl groups of the polyol and any water present in the reaction mixture. Generally, the polyisocyanate is present in an excess equal to about 1 to 15% by weight. When a tertiary amine catalyst is present in the reaction mixture, it is generally employed in an amount equal to from about 0.001 to 3.0 parts per 100 parts by weight of the polyol. When a metal salt curing agent is present, it is generally employed in an amount equal to from about 0.1 to 1.0 part per 100 parts by weight of the polyol. When a separate blowing agent is employed, it is generally employed in an amount equal to from about 1 to 50 parts per 100 parts by weight of the polyol.

When employing the siloxane-oxyalkylene copolymer of formula (1) as an aid in the formation of polyurethane foams, the copolymer is generally present in an amount equal to from about 0.25 to 4.0 parts by weight per 100 parts by weight of the polyol or mixture of polyols in the reaction mixture. While satisfactory results are obtained using amounts of the copolymer in excess of about 4.0 parts per 100 parts by weight of the polyol, e.g., up to about 7.5 parts, no particular advantage is obtained in employing more than the 4.0 parts by weight.

Polyurethane foams can be prepared by one of two general methods employing the siloxane-oxyalkylene copolymer of formula (1). In the first and preferred process, all of the reactants are rapidly mixed together and the reaction mixture is allowed to foam. After foaming has been completed, the resulting foam can be cured if desired by heating at elevated temperatures, e.g., a temperature of from about 75° to 125° C for several hours. Alternatively, the foam can be stored at room temperature until complete cure has been effected in times of from 24 hours to 48 hours or more.

In the second process, a prepolymer is formed from the polyol and the polyisocyanate to give a prepolymer containing excess polyisocyanate. This prepolymer is then mixed with the other reactants, such as water, tertiary amine catalyst, blowing agent, curing catalyst, and siloxane-oxyalkylene copolymer of formula (1) and allowed to foam. In a modification of the second process, the polyisocyanate and a portion of the polyol are reacted together to form a base resin. When foaming is desired, the remainder of the polyol, as well as the other ingredients of the reaction mixture, are added to the base resin and the mixture is stirred and allowed to foam. Again, curing can be effected at room temperature or at an elevated temperature.

Regardless of the foaming process in which the polysiloxane-oxyalkylene copolymer of formula (1) is employed, and regardless of whether the components of the reaction mixture are such as to produce rigid foams, semi-rigid foams or flexible foams, the use of these copolymers results in foams having small, uniform cells and desirably low densities.

Because of the complexity of the well known technology surrounding the manufacture of polyurethane foam of all types, no attempt will be made hereto discuss the many variations in technique and formulations which can be employed. For further details on the technology of polyurethane foams, reference is made to the voluminous patent and technical literature on the subject, especially "Chemistry and Technology," volumes I and II, J. Saunders and K. Frisch, Interscience, New York (1964).

The following examples are illustrative of the practice of the invention and are not intended for purposes of limitation. All weights are given in parts unless otherwise specified.

EXAMPLE 1

To a three-neck, two-liter glass flask equipped with an agitator, thermometer, heating mantle and Dean Stark trap condenser is added 200 parts of a polyether which has a formula of $C_4H_9(OC_2H_4)_{18}(OC_3H_6)_{25}OH$ to 100 parts of a polyether which has a formula of $C_4H_9(OC_2H_4)_{28}(OC_3H_6)_{24}OH$ and 100 parts of a polyether which has a formula of $C_4H_9(OC_2H_4)_{14}(OC_3H_6)_{2.2}OH$. The use of these polyethers in the weight ratio of 50, 25 to 25, resulted in a polyether blend with the average composition $C_4H_9(OC_3H_6)_{22}(OC_2H_4)_{20}OH$. To this polyether blend there is added 350 parts of toluene, 24.2 parts vinyl acetic acid and 8.0 parts of Witco TX acid, which is a commercial grade toluene sulfonic acid. The solution is heated to reflux at a temperature of approximately 118° C and the water of esterification is removed from the system by azeotroping with the Dean Stark trap. By checking the reaction periodically as it proceeds by weak acid titration, it is determined that the reaction is completed in 5.5 hours.

The solution is then cooled to 55° to 60° C, sodium carbonate and water are added to neutralize the toluene sulfonic acid and the excess vinyl acetic acid so as to terminate further reaction or effect on the product by the remaining acid. The reaction mixture is neutralized to a total acid number of less than 0.10 milligrams KOH per gram of sample. The water is then azeotroped out, the mixture cooled to 30° C and the salts are filtered out.

The filtered polyether toluene solution is stripped of toluene at 5 mm of mercury under nitrogen to a pot temperature of 70° C. The resulting material contained approximately 5% toluene, had a viscosity of 350 centistokes at 25° C and an average structure as that set forth in the following formula:

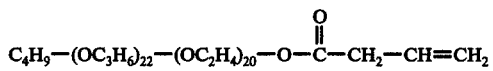

$$C_4H_9\text{—}(OC_3H_6)_{22}\text{—}(OC_2H_4)_{20}\text{—}O\text{—}\overset{O}{\underset{\|}{C}}\text{—}CH_2\text{—}CH=CH_2$$

EXAMPLE 2

To a 500 ml three-neck glass flask equipped with agitator, thermometer, dropping funnel and condenser there is added 80 mg. of previously dried toluene and 25.0 parts of SiH-containing silicone fluid of an average composition,

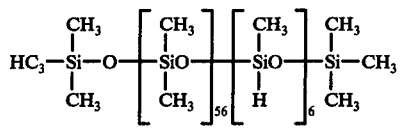

This mixture is heated to 70° C and at that time 0.3 ml of Lamoreaux's platinum catalyst is added. Then there is commenced the dropwise addition of 83 parts of vinyl-stopped polyether which is the product of Example 1 which dropwise addition is continued for 2.5 hours. The amount of vinyl-stopped polyether is 10% in excess of the amount necessary to react with the SiH-containing silicone fluid. An hour after the end of this dropwise addition, an additional amount of 0.10 ml of catalyst is added and the reaction continued for another hour. Turning the reaction procedure, the pot temperature is held at 70° ± 3° C throughout the reaction. The reaction is allowed to proceed for a total time of 4.5 hours. The reaction mixture is then cooled to 25° C and sampled for percent conversion. Based on the infrared peak for SiH 4.6 m, the reaction is 96.1% complete.

To the reaction mixture there is added 0.5 g of triethanol amine which is used to raise the pH of the product to between 7 and 9 so as to eliminate free acid groups from the reaction product, which free acid groups would attack the carboxyl linkage and degrade the polymer. The toluene solvent is then stripped off the reaction product at 5 mm mercury under nitrogen with a pot temperature of 80° C. The copolymer product is cooled to 25° C and filtered. The resulting copolymer has no SiH peak at 4.6 m, a viscosity of 13,147 centistokes at 25° C and has the following structure:

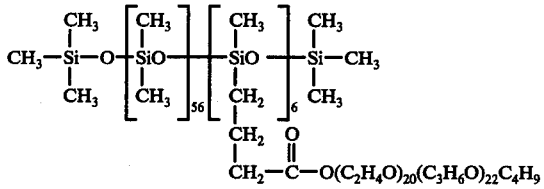

EXAMPLE 3

There is prepared by the method of Examples 1 and 2 samples of the following three surfactants:

Surfactant A

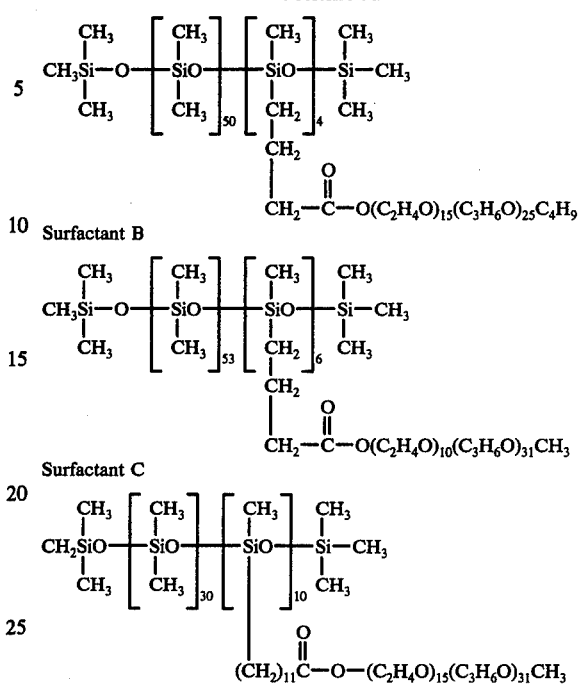

Surfactant B

Surfactant C

These surfactants were used in the standard polyurethane foam test to produce samples of foams. The surfactants were used at different concentrations of parts surfactant per 100 parts of polyol to obtain the different foam samples. There are also subjected to the same test control A and control B which are two of the best polyurethane surfactants for flexible foams presently available on the market. The densities of the foams obtained by the use of the different surfactants and at different concentrations are shown in Table 1 below in pounds per cubic foot. There is also listed the bun foam height in inches obtained at the different concentrations of surfactant. Since the same amount of the ingredients is used in each sample that was run, with the exception that the surfactant concentration is varied, there is indicated by the bun height results the amount of foam that is produced by a particular surfactant at a particular concentration of surfactant in the foam.

TABLE I

| Concentration of Surfactant phr | Foam Densities lbs/ft³ | | | | Bun Height, in. | | | |
|---|---|---|---|---|---|---|---|---|
| | 0.5 | 0.6 | 0.8 | 1.0 | 0.5 | 0.6 | 0.8 | 1.0 |
| Control A | 1.35 | 1.36 | 1.32 | 1.31 | 10 | 9 ¾ | 10 ½ | 10 ¾ |
| Surfactant A | 1.32 | 1.30 | 1.27 | 1.28 | 10 ½ | 11 | 11 ¾ | 11 ¼ |
| Surfactant B | 1.35 | 1.32 | 1.31 | 1.29 | 10 | 10 ½ | 10 ¾ | 11 ¼ |
| Control B | 1.34 | 1.34 | 1.34 | 1.31 | 10 ¼ | 10 ¼ | 10 ¼ | 10 ¾ |
| Surfactant C | 1.31 | 1.32 | 1.30 | 1.31 | 10 ¾ | 10 ½ | 11 | 10 ¾ |

It can be seen from this table that at the same surfactant concentration, the foam densities using the surfactants of the present case are at least the same and, in most cases, are better than the foam densities obtained using surfactants Control A and Control B which are the surfactants presently on the market. The lower the foam density that is obtained, the more efficient is the surfactant at a particular concentration. As a result, it can be concluded from this table that the surfactants of the present case are at most concentrations more efficient than the surfactants of the prior art.

Further, the data in the bun height columns indicates that at least the same amount of foam and in most cases more foam is produced at a particular surfactant concentration by the surfactants of the present case than is produced by the surfactants of the prior art.

EXAMPLE 4

There is separated out four samples of Surfactant A of Example 1. Two of the samples are set aside and aged for 25 days and 90 days, respectively, and then are used at a concentration of 0.6 phr to produce foams in accordance with the standard polyurethane foam test. Five parts of one of the remaining two samples is taken and mixed with 44 parts of water and aged for 25 days at 25° C. Then 4.9 parts of this blended sample is taken and used per 100 parts of polyol to prepare a foam in accordance with the standard polyurethane foam test. From the fourth sample there was taken 5 parts of the surfactant and mixed with 44 parts of water. This fourth sample, a water-surfactant blend, is aged to 90 days at 25° C. At the end of this period, 4.9 parts of the water-surfactant blend, aged for 90 days, is used to prepare a foam in accordance with standard polyurethane foam tests. The results of these tests in density of foam and foam height are shown in Table II below.

TABLE II

| Days of Aging | Foam Density | | | Foam Height | | |
|---|---|---|---|---|---|---|
| | 0 | 25 | 90 | 0 | 25 | 90 |
| Surfactant A | 1.37 | 1.37 | 1.38 | 9" | 9" | 8 ¾" |
| Surfactant A/H₂O Blend | — | 1.38 | 1.39 | — | 8 ¾" | 8 ½" |

It can thus be seen from these results that there is no appreciable difference in the change in foam density between the sample of Surfactant A that was blended with the water and the portion of Surfactant A that was not blended with the water.

It can be seen from these results that there is only a small change in density in the foams produced by the use of Surfactant A blended with water and aged 25 days and the surfactant not blended with water and aged 25 days. After the blended and unblended samples of Surfactant A have been aged for 90 days, there is still only a one-hundredth difference in foam density in the foam produced. It can also be seen from the above data that the aging of the unblended surfactant for 25 days has no variation at all on the density of the foam produced. It can also be seen from this data that the aging of the unblended and blended surfactant for 90 days only produces a change in foam density in the one-hundredth decimal point.

I claim:

1. A polyurethane foam composition formed from a mixture of a polyether or polyester, a polyisocyanate, a blowing agent in minor amounts sufficient to foam the mixture, a catalyst for catalyzing the reaction between the polyether or polyester and polyisocyanate and a polysiloxane surfactant in sufficient amount to control the foam comprising a compound of the formula,

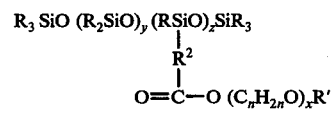

where $y$ is a whole number varying from 15 to 150 and $z$ is a whole number varying from 3 to 16 where R and R' are monovalent hydrocarbon radicals of less than 8 carbon atoms, $R^2$ is selected from alkylene and arylene radicals of from 11 to 20 carbon atoms, $n$ is an integer that varies from 2 to 4, $x$ varies from 5 to 30 for the case $n$ is equal to 2, $x$ varies from 1 to 40 for the case $n$ is equal to 3 and 4 where there may be ether units with $n$ equal to 2, 3 and 4 in the same molecule.

2. The composition of claim 1 wherein there is utilized 0.25 to 7.5% by weight of said polysiloxane surfactant based on the weight of said polyether or polyester.

3. The composition of claim 2 wherein the polysiloxane surfactant has the formula,

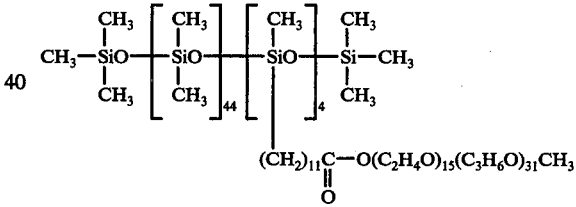

* * * * *